Sept. 12, 1933.　　　　　C. A. WINSLOW　　　　　1,926,077
ENGINE
Filed April 3, 1931　　　4 Sheets-Sheet 1
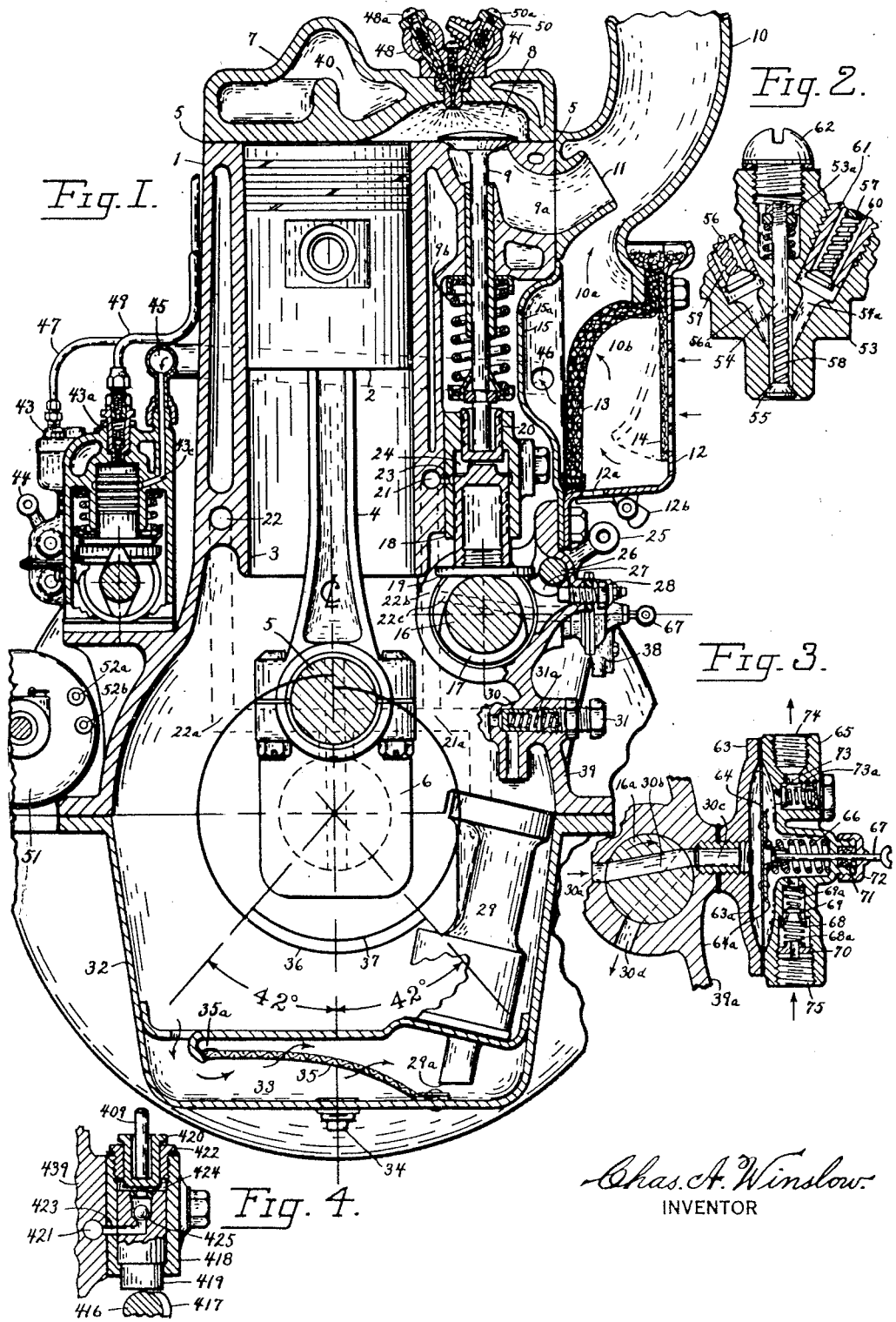
Chas. A. Winslow
INVENTOR

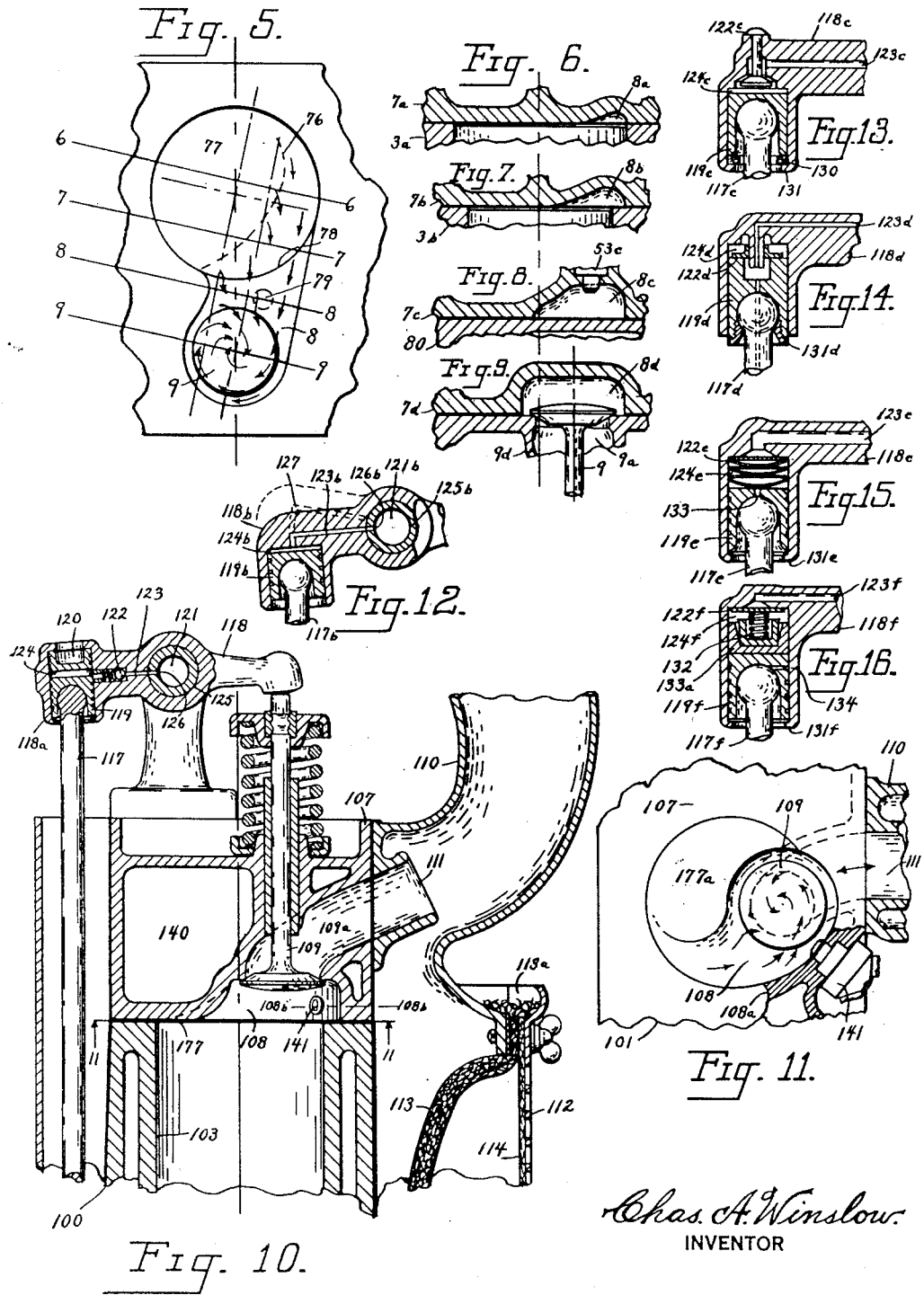

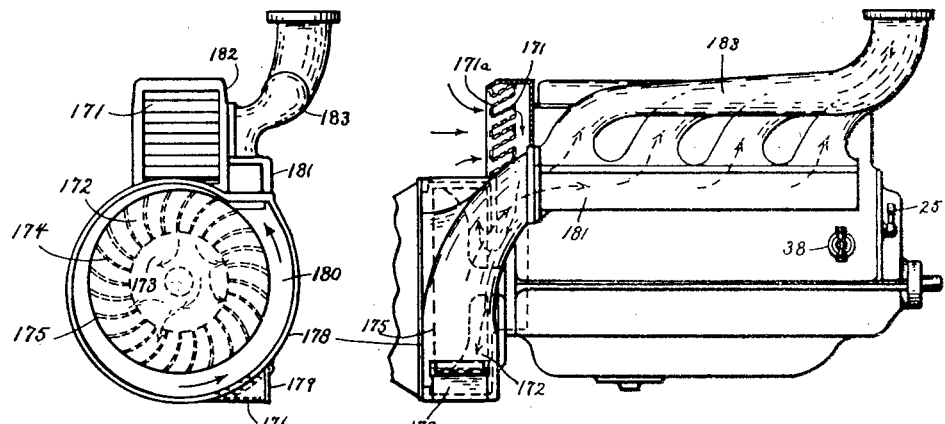
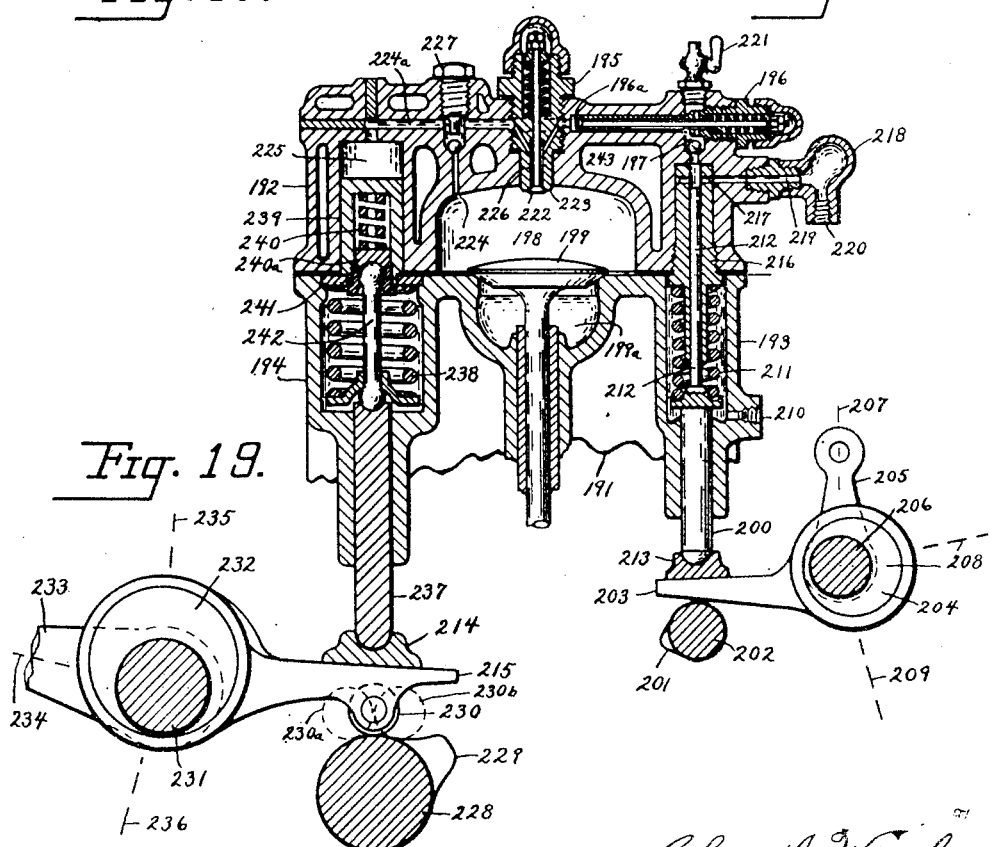

Sept. 12, 1933.  C. A. WINSLOW  1,926,077
ENGINE
Filed April 3, 1931  4 Sheets-Sheet 4

Chas. A. Winslow.
INVENTOR

Patented Sept. 12, 1933

1,926,077

UNITED STATES PATENT OFFICE 1,926,077

ENGINE

Charles A. Winslow, San Francisco, Calif., assignor, by mesne assignments, to American Diesel Engine Company, a corporation of California Application April 3, 1931. Serial No. 527,452

6 Claims. (Cl. 123—79)

The present invention relates to hydro-carbon engines, particularly of the Diesel cycle and has for its principal objects the simplification of the engine design generally, and novel means of operating a four cycle engine on heavy fuel in either direction with only one valve per cylinder, elimination of valve tappet adjustment, prevention of damage to the engine in the event of the lubricant supply failing or becoming exhausted, novel means of metering and mixing fuel and air for combustion within the cylinder, prevention of dust entering the engine with the air supply, prevention of noises issuing from the air induction system and other novel features.

In the past it has been customary to resort to the use of two valves per cylinder in designing a four cycle engine. In the present invention however, only one valve is required because of the novel design of the cylinder head, manifolding, camshaft etc. Exhaust valve cooling has also been a very serious detriment to the successful operation of high speed engines. In the present invention the exhaust valve is not only cooled by the usual means but is also cooled by each inlet air charge which passes around the valve stem, seat and head. Exhaust manifold cooling has also been a serious problem in the past and often a serious fire hazard. In the present invention the exhaust manifold is air cooled after each exhaust from the cylinder by causing cool fresh air to follow and scavenge the exhaust charge in the exhaust pipe by an ejector effect of the exhaust gases in a similar manner to that disclosed in my former application, Ser. No. 236,284, filed Nov. 28, 1929, Exhausting system for hydrocarbon engines and the like.

Incorrect valve tappet adjustment has in the past been the cause (directly or indirectly) of holding valves open, thus causing leakage and burning. Wear on the valves and seat allows the valve to settle and high operating temperatures cause the stem to expand thus contributing to incorrect clearance between the stem and tappet. In the present invention the valve stem and tappet are not provided with a manually operable or fixed adjustment. The valve stem and tappet are separated by an oil film under pressure from the lubricating system thus insuring not only quiet operation but ample clearance under all normal operating conditions. In the event of failure of sufficient oil pressure in the lubricating system the oil film is automatically eliminated causing noisy valve operation and serving as a warning to shut down. Power is also reduced because the valve lift is reduced thus throttling the air pumping ability of the engine.

It has been conventional in the past to supply fuel to hydro-carbon engines by a mechanically driven fuel pump, thus as long as the engine could rotate fuel was supplied. In the present invention however, fuel is supplied only while the lubricant is under normal pressure and flowing thru the lubricant supply passages. The fuel pump is driven directly by the lubricant pressure. In the event of burned out bearings, clogged oil pump inlet, or lack of normal lubricant supply and pressure from any cause whatever the fuel pump cannot supply fuel for operation. Thus the engine cannot be damaged from loss of or failure of the lubricant supply.

Fuel has been supplied in the past to conventional Diesel engines either by air or solid injection systems which are not only complicated and costly but also poorly adapted to high and variable speeds which are absolutely essential to vehicle operation. In the present invention however, fuel is first metered by a very simple pump, delivered to a simple nozzle in the cylinder where it is heated and at the proper time sprayed into the combustion chamber by a charge of compressed air from an engine driven piston, thus insuring complete atomization of the injected fuel charge.

In conventional Diesel engine design it has been customary to resort to various devices to obtain turbulence within the cylinder during combustion. In the present invention however, a high state of turbulence is obtained due to the novel design of the cylinder head, and the fact that practically all of the air within the cylinder during the compression stroke is forced from the cylinder into the combustion chamber over the single valve. Fuel injection takes place about the time that the last part of the charge is leaving the cylinder. Expansion and burning force the piston down and allows practically all of the compressed and burning charge to repass from the combustion space back into the cylinder. Thus, the compressed air charge passes the injection nozzle twice during each firing cycle insuring complete mixing of the atomized fuel oil with the air and making possible more complete and faster burning of the charge. This feature promotes better fuel economy, increased flexibility of operation and also makes possible, higher operating speeds with lower maximum pressures than has been obtainable with conventional oil burning engines used in the past.

One of the principal causes of premature wear and deterioration of engines on commercial vehicles, tractors, farm and road machinery etc. is caused by dust being drawn into the engine with the air supply. Air filters have been installed to prevent this menace but in conventional practice and particularly truck and buss applications an adequate sized efficient air cleaner cannot be installed because of space limitation and expense of installation. In the present invention an adequately large and highly efficient air filter is built into the engine and occupies no additional space whatever as it forms the valve cover and serves also as a muffler to silence the noise generally present from the air induction passages. The present novel built-in air filter also incorporates self-oiling, washing and crankcase ventilating features similar to several of my former patents and pending applications such as Patents Nos. 1,702,804, 1,555,664, and 1,751,915 and applications Ser. Nos. 305,106, 229,651, 177,183 and 331,488. In addition to the self-washing and oiling features it also has a self-cleaning feature whereby collected dust and oily sludge is automatically discharged when a certain amount is collected in the bottom of the filter.

With these and other objects in mind as important features of the invention I now refer to the drawings in which, Fig. 1 is a sectional view of an engine taken thru the cylinder, crankcase, combustion and valve chamber, manifold, air filter, injection valve and fuel atomizer pump.

Fig. 2 is an enlarged sectional view of part of the fuel injection valve shown on Fig. 1, illustrating the details of the three check valves used in that particular form of fuel injection.

Fig. 3 is a sectional view of the fuel supply pump and illustrates one form of its application to a motor.

Fig. 4 is a sectional view of a modified form of valve lift mechanism wherein is illustrated, a means of taking up the tappet and valve stem clearance with oil under pressure and a means of increasing the valve lift to a greater degree than the camlift.

Fig. 5 is a plan view taken on the line 5—5 of Fig. 1 and particularly illustrates the path of the turbulent compressed air charge on compression stroke when forced from the cylinder into the combustion chamber.

Fig. 6 is a sectional view of the combustion chamber on the line 6—6 of Fig. 5.

Fig. 7 is a sectional view of the combustion chamber on the line 7—7 of Fig. 5.

Fig. 8 is a sectional view of the combustion chamber on the line 8—8 of Fig. 5.

Fig. 9 is a sectional view of the combustion chamber on the line 9—9 of Fig. 5.

Fig. 10 is a sectional elevation thru part of a novel single valve four cycle engine embodying various features of the invention as modified to suit a valve in head arrangement.

Fig. 11 is a bottom view of the head used on the engine shown in Fig. 10 taken on the line 11—11 looking in the direction indicated by the arrows and further illustrates the modified form of valve, combustion chamber, exhaust outlet and manifold ejector pump arrangement suitable to this type of engine.

Fig. 12 is a sectional view of a simple modified form of means for automatically taking up the clearance between the valve stem and cam-shaft with lubricant under pressure from the lubricating system.

Figs. 13,—14,—15, and 16 illustrate still further modifications of means for taking up the clearance between the valve stem and cam-shaft with lubricant under pressure.

Fig. 17 is a rear elevation of an engine incorporating a novel fly-wheel blower and an air filter suitable for supplying clean air to the air induction system of the engine under pressure.

Fig. 18 is a side elevation of the engine shown in Fig. 17 and further illustrates the forced draft air induction system by dotted arrows showing the air passage thru the novel design and arrangement of manifolding suitable for multi-cylinder engines of the type embodying the features of the present invention.

Fig. 19 is a sectional, diagrammatic view thru an engine embodying the invention and illustrates the mechanism for metering, timing, heating, injecting and atomizing the fuel and further illustrates the novel valve and combustion chamber arrangement.

Figure 20:
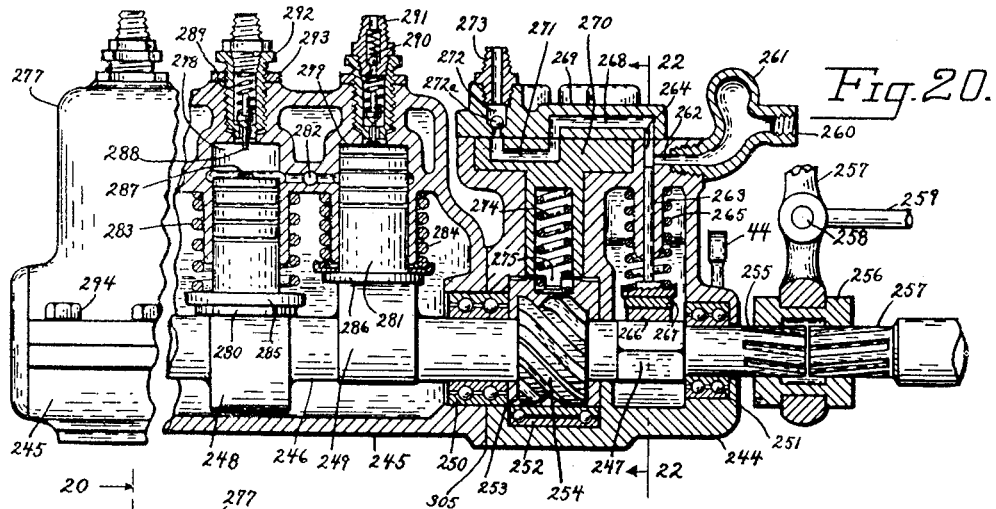
Figure 21:
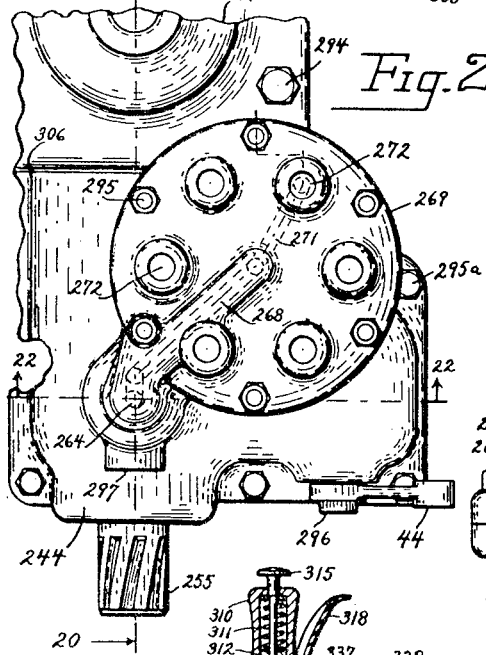

Fig. 20 is a partly sectional elevation taken on the irregular line 20—20 of Fig. 21 and illustrates a preferred form of fuel metering and atomizing pump suitable for multi-cylinder engines.

Fig. 21 is a plan view of the device shown in Fig. 20 and illustrates the general arrangement of the fuel distributor and the oil and air pumps.

Figure 22:
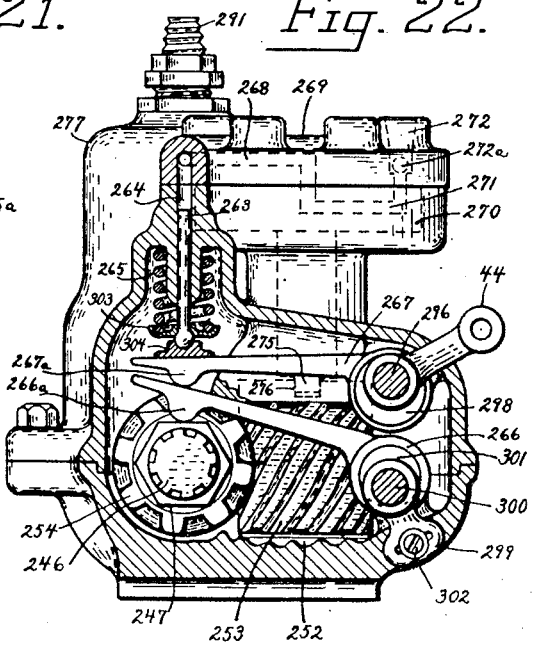

Fig. 22 is a partly sectional view taken on the line 22—22 of Fig. 20 looking in the direction indicated by the arrows and illustrates particularly the means of operating the fuel pump, means of timing the pump discharge, and means of metering the fuel to suit power requirements.

Figure 23:
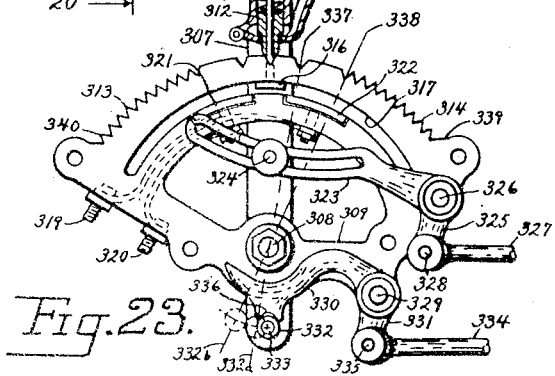

Fig. 23 is a diagrammatic elevation of the complete control mechanism for operating the engine as a reversible type and illustrates the valve raising and compression release means, the braking means, the electric starting and reversing means and the fuel control means, all operated by one lever in such a manner that an unskilled operator cannot damage the engine in starting or handling.

Corresponding and like parts are referred to in the following description and designated in the several views of the illustrative drawings by similar reference characters.

In Fig. 1, reference character 1 designates generally a four cycle L head, reversible engine of the Diesel cycle embodying the novel features of the invention. 2 is a piston within the cylinder 3. 4 is a connecting rod, 5 is a crankpin and 6 a crankshaft, all of conventional design. 7 designates the novel head, embodying the combustion chamber 8 over the single valve 9. 10 designates the novel manifold arrangement forming an ejector in combination with the exhaust jet orifice 11. 12 is a perforated outer air filter and muffler casing enclosing the fibrous material 13 and flexible valve 14. 12a is a dust and sludge outlet normally closed by the weighted valve 12b. 15 is the inner casing of the air filter and muffler and it also forms the valve cover plate. 15a is a crankcase vent port in the valve cover plate 15. 16 is the camshaft and 17 the wide faced cam which holds the valve 9 open 444 degrees per working cycle. 18 is the valve tappet guide casing enclosing the tappet 19 and the valve stem cup 20. 21 and 22 are lubricating oil headers or passages for conveying oil under pressure to the various parts to be lubricated. The port 23 supplies oil under pressure from the header to the chamber 24. 25 is a valve lift lever mounted on a shaft 26 on which compression release cam 27 is mounted. 28 is an adjustable screw stop for cam 27 and indirectly forms a rest for tappet 19. 29 is a conventional lubricant pump which forces lubricant to the headers 21 and 22 thru passages shown dotted and designated by the figures 21a and 22a. 30 is a pressure regulating piston valve held on its seat by the adjustable hollow screw 31 and the spring 31a. 32 is an oil pan and lubricant reservoir. 33 is a sludge sump. 34 a drain plug, and 35 an oil filter and sludge trap. The circular segmental lines 36 and 37 designate a preferred setting of the valve timing of the engine of which the character ℄ is dead center. The numerals 42 with the degree symbol indicate respectively the opening and closing point of the single valve 9 which serves both as an inlet and exhaust valve.

The numeral 38 indicates a fuel supply pump attached to the engine crankcase 39 in a manner as further disclosed in Fig. 3. 40 is the water jacket space surrounding the cylinder 3, the valve port 9a, the combustion chamber 8 and the nozzle of the fuel injection valve 41. 43 designates the fuel metering pump and 43a the injection pump. 44 is the lever operable for controlling the fuel volume. 45 is the air inlet duct or pipe adaptable in this particular case to convey clean air to the fuel injection pump suction 43c from the port 46 inside of the filtering medium 13 within the air filter. 47 is a fuel supply line adaptable to convey fuel under pressure from the metering pump 43 to the oil side 48 of the fuel injection valve 41. 49 is an injection air supply line adaptable for conveying high pressure atomizing and injection air from the pump 43a to the air side 50 of the fuel injection valve 41. 51 is an electric motor-generator, chain driven or geared to the crankshaft of the engine 1 in a conventional manner (not shown) and adapted to be rotated in either direction when the engine is used as a directly reversible type engine such as some marine installations require, or as a conventional starter-generator in automotive installations where reversal of the engine is not required.

52a and 52b are terminals for battery connections in conjunction with the starting and reversing mechanism disclosed in Fig. 23.

In Fig. 2 an enlarged view of the details of construction of the injection valve 41 are shown in which 53 designates a sectional fragmentary portion of the body of the valve. 54 is a central spring loaded check valve closing the injector nozzle outlet 55. 56 is a similar spring loaded check valve closing the fuel oil outlet to the injector. 57 is a third and similar spring loaded check valve closing the air outlet to the injector. 58 is an annular space around the valve 54 wherein the fuel oil is deposited thru passage 56a from the space 59 by each stroke of the fuel pump. 60 is an annular space around the air check 57 from which highly compressed atomizing and injection air is forced thru passage 54a by each stroke of the air pump. 61 represents one of the hollow cross-drilled cap screw arrangements containing the check valves 56, 57 and the springs and vent plugs 48a and 50a illustrated in Fig. 1. 62 is a screw plug similar to the vent plugs 48a and 50a and closes the spring space 53a in the injector body 53.

In Fig. 3, 63 is the inside portion of the casing of a fuel pump body. 64 is a flexible diaphragm held against 63 on its periphery by the outer body casing 65 of the pump. 39a is a sectional fragmentary portion of the engine crankcase taken at a camshaft bearing showing certain oil ducts 30a, 30b and 30c thru which oil flows as is indicated by the arrows. 66 is a spring holding the diaphragm 64 in tension. 67 is a priming rod with a loosely fitting head held in a cavity formed between the diaphragm 64 and the stamping 64a and is adapted for operating the fuel pump and priming the fuel system by manual or mechanical means. 68 is a hollow conical shaped relief check valve held seated on the casing 65 by a spring 68a. 69 is an inlet disc check valve seating in the opposite direction and held seated on the outlet of the hollow valve 68 by the lighter spring 69a. 70 is a manually adjustable hollow screw plug suitable for changing the seating tension on relief valve 68 by compressing the spring 68a more or less by movement of the plug 70 in or out in the threaded inlet port 75 of the casing 65. 71 and 72 are the packing and nut serving to prevent fuel leakage past the rod 67 which must be understood as operative only during priming operations as the head on the rod 67 is free within certain limits in the stamping 64a. 73 is an outlet disc check valve held closed by the spring 73a. 74 is the threaded pump outlet and 75 the inlet.

In Fig. 4 the numeral 418 designates an alternate form of valve tappet guide casing bolted to the crankcase 439. 419 is an alternate form of tappet wherein oil is forced by pressure from the duct 421 thru the port 423 into the chamber 424 past the check valve 425. The cup shaped piston 420 is a slidable fit in the bushing 422 which in turn is a pressure tight screw fit in the valve tappet guide casing 418. The tappet 419 is normally held down by oil pressure on a seat formed by a reduction of its lower diameter in the casing 418. The cupped piston 420 is normally held up by oil pressure against the valve stem 409 thus eliminating clearance between the tappet and valve stem. The camshaft 416 carries a wide cam 417 similar to that previously described in Fig. 1.

In Fig. 5 sheet 2, the dotted line 76 indicates approximately the point at which the combustion chamber 8 flattens to piston clearance only at 77 and gradually opens up to a free passage between the cylinder and the valve chamber at the cylinder wall line 78. The dotted circle 79 indicates the favorable location of the fuel injection nozzle outlet 55 which is in the path of greatest turbulence. The arrows indicate the turbulent path of the air charge on compression stroke and show also the induced whirling and spinning movement over the valve 9.

In Fig. 6, 3a is a fragmentary section of the cylinder wall, 7a the same of the head and 8a a section thru the combustion chamber taken at the line 6—6 of Fig. 5, indicating the preferred form in which the combustion chamber is gradually reduced to piston clearance only opposite the valve side.

In Fig. 7, 3b is the cylinder wall, 7b the head and 8b the form of the combustion chamber 8 at the line 7—7 of Fig. 5.

In Fig. 8, 80 indicates a section of the bottom of the combustion chamber wall at the line 8—8 of Fig. 5. 8c indicates a section taken thru the combustion chamber 8 also on the line 8—8 of Fig. 5. 53c indicates the preferred position of the injection valve 41.

In Fig. 9, 7d is the head, 8d a section of the combustion chamber 8 on the line 9—9 of Fig. 5. 9 is the single valve serving as both inlet and exhaust and 9d is a fragmental sectional view thru the valve port 9a on the line 9—9 of Fig. 5.

In Fig. 10 the numeral 100 indicates a valve in head engine generally, 103 is a cylinder, 107 is a novel head in which a single valve 109 is operably mounted between the combustion chamber 108 and the valve port 109a. 111 is an exhaust ejector jet orifice discharging into a Venturi formed manifold 110, forming in combination a novel aspirator or jet pump arrangement. 112 is a perforated air filter and muffler casing enclosing a flexible valve 114 and fibrous filtering and muffling element 113. 113a is a cup or trough to retain oil for oiling and washing down collected dust from the flexible valve 114 and the filtering and muffling element 113.

117 is a conventional push rod with ball joint upper end fitted into a socket in the piston 119. 118 is a rocker arm in which a cylinder 124 is formed on the large end 118a. 120 is a second piston also designed to fit into the cylinder 124 and normally seat on a reduced diameter at the upper end thereof. 121 is a lubricant duct in the hollow stationary rocker arm bearing shaft 125. 122 is a ball check in the smaller lubricant duct 123, which (when the valve 109 is seated) is in communcation between the cylinder 124 and the duct 121 thru the properly drilled port 126 in the stationary rocker arm shaft 125. 140 is the water jacket space surrounding the cylinder 3, valve port 109a and the combustion chamber 108. 177 is the flat portion of the cylinder head in which no combustion space is provided.

In Fig. 11, 101 is a section of the bottom of the head 107 of Fig. 10, in which the combustion chamber 108, valve 109, injection valve 141, manifold 110 and exhaust outlet orifice 111 are shown in their respective positions. 108a is a fragmental portion of the combustion chamber wall on the line 108b of Fig. 10. 177a is the flat portion of the head with piston clearance only provided above the cylinder as in Fig. 1.

In Fig. 12, 117b is a ball jointed push rod end 118b is a portion of a rocker arm in which a cylinder 124b is formed.

A piston 119b is held in the cylinder 124b by the push rod 117b. 121b is a lubricant duct in connection with the pressure lubricating system. 125b is a stationary rocker arm bearing shaft with a suitable drilled port 126b which is in communication with the cylinder 124b thru duct 123b when the engine valve (not shown) is closed, and out of communication with the cylinder 124b when the valve is held open as shown by the dotted section of duct 123b at 127.

In Fig. 13 a ball jointed push rod 117c forces a piston 119c into a cylinder 124c formed in the large end section of the rocker arm 118c. A duct 123c conveys lubricant under pressure from the lubricating system thru check valve 122c into cylinder 124c. A soft seat is provided for the piston 119c by the ring of flexible material 130 which is held in the cylinder by the formed edge 131.

In Fig. 14 a ball and socket joint are formed by the end of the push rod 117d the piston 119d and the nut 131d. A lubricant duct 123d is formed in the rocker arm 118d and the push rod 117d. Lubricant is supplied to the cylinder 124d under check valve 122d. The duct 123d may be supplied with lubricant from either the push rod end or the rocker arm end.

In Fig. 15 the push rod end 117e forms a ball and socket joint with the bottom of the piston 119e which in turn is held in the cylinder 124e of the rocker arm 118e by the formed edge 131e. A lubricant duct 123e in the rocker arm conveys oil under pressure from the lubricating system to the cylinder 124e past the top check valve disc 122e. A series of curved and flat discs within the cylinder as shown, form an additional cushioning means of seating the valve 122e and also normally closing the port 133 except for lubrication leakage requirements.

In Fig. 16 a ball and socket joint are formed by the push rod 117f and the piston 119f. A lubricant duct 123f is formed in the rocker arm 118f and is adapted to supply oil under presure by the valve 122f to the cylinder 124f by compressing the spring 132 which also holds the flexible cup piston 133a in compression against leakage except as required to lubricate the ball and piston thru groove and port 134.

In Fig. 17, 171 designates an air filter and sound dampener, thru which air is drawn by the fly-wheel blower 172. 173 is the vortex space behind the fly-wheel and the dotted arrows indicate the air flow lines. 174 designates the blades of the blower which are cast on or otherwise attached to the inside of the flywheel 175. A dust and oil trap 176 is provided on the bottom of the flywheel housing 178. A swinging door 179 allows collected dust or oil to be discharged as required. 180 designates the space around the periphery of the flywheel blower 172 and is in direct communication with the inlet air duct 181 of the engine 182. 183 designates the Venturi formed exhaust pipe in communication with the air duct 181 combining with the exhaust outlet orifices to form an ejector pump arrangement previously described in Figures 1 and 10 and further illustrated in Fig. 18.

In Fig. 18, 171a is the air inlet to the filter 171. The arrows indicate the air flow path thru the filter 171, blower 172, air duct 181 and manifold 183. 25 is the compression release lever and 38 the fuel supply pump.

In Fig. 19, 191 is the cylinder block generally. 192 is the head, 193 the fuel metering pump housing, 194 the fuel injection pump housing, 195 the fuel injection valve generally. 196 is a novel fuel check valve adaptable to deliver a solid volume of fuel to the injection valve 195 and prevent air or gas from leaking into the fuel passages 197. 198 is the combustion chamber. 199 the valve, 199a the valve port, 200 is the fuel pump tappet. 201 the fuel pump lift cam, mounted on the shaft 202. 203 is the fuel metering wedge shaped lift lever journaled on the eccentric 204. 205 is the fuel control or metering lever attached to the shaft 206. 207, 208 and 209 designate the closed (or stop) half and full power positions of the fuel control lever 205. 210 is a fuel leakage drain port. 211 is a spring adaptable to hold the fuel pump piston 212 down on the shaft 202 and serving to prevent any lost motion in the fuel pump assembly. 213 and 214 are hardened flat bottomed cups adaptable to fit the ball end of the fuel and air pump tappets and slide on the operating levers 203 and 215. 216 is the fuel pump cylinder with cross drilled ports at 217 which are in communication with the fuel supply surge chamber 218 thru the port 219. 220 is the fuel inlet to which fuel is supplied preferably under a few pounds pressure. 221 is an air vent cock adaptable to bleed air from the fuel system. 222 is a spring closed injector valve in the outlet of the fuel injector nozzle 223. 224 is an air port from the combustion chamber 198 adaptable to supply air under pressure during compression stroke to the cylinder 225 and the space 226 around the fuel injection valve 222.

A plug 227 retains a ball check over the port 224 allowing air to pass out only from the combustion chamber 198 to the cross drilled port 224a. A cam shaft 228 carries a cam 229 adaptable for engagement with the roller 230 of the rocker arm 215. A shaft 231 carries an eccentric 232 on which the rocker arm 215 is journaled. A lever 233 is attached to the shaft 231 and is adaptable to change the timing of the fuel injection from dead center at 234 to advance at 235, or either retard or reverse 236. 237 is a tappet adaptable to compress the spring 238 and raise the piston 239 by the cam lift or shaft 228. 240 is a relatively stiff spring within the piston 239. 241 is a seat mounted in the housing 194 and adaptable to form a pressure tight seal for the cylinder 225 when the piston 239 is down and relieved of the thrust from the cam 229. 242 is a ball jointed connecting rod between the tappet 237 and the spring 240. 243 is the water jacket space surrounding the various parts to be cooled.

In Fig. 20, 244 is a casing enclosing a fuel metering and distributing pump generally. 245 is the lower half of a casing enclosing an atomizing and injection pump generally. 246 is a camshaft on which is mounted the oil pump cams 247 and the air pump cams 248 and 249. Ball bearings are provided for the cam shaft at 250, 251 and other locations as required. 252 is a ball thrust bearing for the worm gear 253 shown in section which is driven by the gear 254 mounted on the shaft 246. Shaft 246 has a right hand spline on the end 255 which engages in the splined collar 256. A left hand splined driver shaft 257 also engages in the splined collar 256. A lever 257 is adaptably arranged to move the position of the collar 256 by movement of the eye 258 with a timing control rod 259. A fuel metering control lever is provided at 44. A fuel inlet 260 is provided in the surge chamber 261, the outlet of which terminates in the port 262. A fuel pump piston 263 operates in the cylinder 264. A spring 265 holds the fuel pump piston down on the timing and metering levers 266 and 267. A port 268 in the fuel distributor head 269 connects the outlet of the fuel pump cylinder with the center of the fuel distributor member 270.

A single U shaped port 271 connects the center of the fuel distributor with the fuel supply outlets 272 in which a suitable check valve 272a is provided as shown. Suitable fittings 273 are prdovided in each outlet to connect the fuel lines to the oil side of the individual injection valves as illustrated in Fig. 1.

A spring 274 inside of the hollow fuel distributor 270 rests in a recess in the top of the worm gear 253 and serves to hold the top surface of the distributor 270 tightly against the ported head 269.

A key 275 is formed on the bottom of the hollow distributor member 270 which engages in a key slot in the gear member 253 below. The two bottom coils of the spring 274 are broken away to show this key and slot arrangement and it is further illustrated in Fig. 22. 277 designates the fuel atomizing and injection pump casing generally, which is shown partly in section. 278 and 279 are jacketed cylinders within the casing 277. 280 and 281 are pistons within the cylinder. 282 is the air inlet port to the cylinder 278 and 279. 283 and 284 are springs which retrieve the pistons when they are forced into the cylinders by the action of the cams 248 and 249. 285 and 286 are stamped cups in which the springs 283 and 284 rest in compression. The cups 285 and 286 are in turn resting on the flanged bottom of the pistons 280 and 281. The pistons are preferably provided with small hardened contact buttons 287 serving to raise at a predetermined point the outlet valves 288 against the spring 289. Suitable check valves 290 are provided in the outlet fitting 291. Adjustable valve cages 292 enclosing the valves 288 and springs 289 are locked in adjustment by the nuts 293. The casing 277 is preferably bolted to the lower casing 245 by the capscrews 294.

In Fig. 21 the numeral 244 designates the casing of the fuel metering and distributing pump generally. 255 is the splined driveshaft of the pump. 264 (dotted lines) is the fuel pump piston, 268 the fuel port in the distributor head 269. 271 is the U shaped port in the fuel distributor rotating member 270. The numerals 272 are the fuel outlet ports to which separate fuel lines are attached for each fuel injection valve. While six are illustrated it is to be understood that any number desirable can be incorporated in the head 269 and the pump 263 properly timed to suit. Capscrews or nuts and studs 295 are provided to properly and securely hold the head 269 to the upper part of the fuel pump casing 244. Capscrews 295a serve to hold the upper and lower halves of the fuel pump casing 244 securely together. A fuel control shaft 296 is provided with a suitable lever 44 for either governor or manual operation. 297 is the boss into which the surge chamber 261 is normally screwed as illustrated in Fig. 20. 277 designates a broken section of the jacketed cylinder 278, 279 and the casing 277 surrounding them.

In Fig. 22, 277 designates the casing of the air pump generally of which 291 is an outlet connection. 246 designates the end of the camshaft on which the fuel cams 247 are formed. 254 is the horizontal worm gear (attached to the shaft 246) which drives a similar but vertically disposed worm gear 253 which is held in contact with the ball thrusts 252 below the gear by a spring 274 inside of the hollow rotary fuel distributor member 270. 275 in dotted lines indicates the key formed on the shank of the distributor member 270 which fits into the key slot 276 in the top of the gear member 253. Thus, gear 254 drives gear 253 which rotates the distributor member 270 by the key and slot arrangement 275 and 276. A fuel volume control lever 44 is mounted on a movable shaft 296 which carries eccentric 298 which in turn forms a bearing for the wedge shaped rocker arm 267. Thus, as the shaft 296 is rotated by the lever 44 the contact point 267a of the rocker arm moves up or down on the incline of the arm 266 forming a controllable means of raising or lowering the working position of the pump piston 263 in the cylinder 264. A short slotted lever 299 is attached to a second shaft 300 which carries an eccentric 301 on which the rocker arm 266 is journaled. The contact time of the cam points 247 on the shaft 246 with the contact point 266a of the rocker arm 266 can be varied to suit requirements by movement of the lever 299 and locked in position by the lock screw 302. However when the timing arrangement consisting of parts 255, 256 and 257 etc. is not used, a manual or governor control can be provided. A compression spring 265 surrounding the lower extension of the fuel pump cylinder 264 bears on the spring retainer cup 303 which in turn snugly fits over the ball end of the pump piston 263. A hardened flat bottomed cup member 304 rests on rocker arm 267 and snugly fits the ball end of the piston 263 forming a ball and socket joint which prevents any side thrust on the pump piston 263 during operation. The spring 265 holds the parts 263, 304, 267 and 266 in contact with the camshaft 246 thus retrieving the pump piston and preventing any lost motion which might occur from wear etc. It is to be noted that the fuel pump and air pumps are separate devices jointed at 305 in Fig. 20 and 306 in Fig. 21 for convenience of operation and compactness. However, the fuel metering pump and distributor are operable as a separate unit for solid injection fuel systems. In this case the valve 195 in Fig. 19 is sufficient without the air injection features. Valve 196 can be eliminated if required or substituted for valve 195. One spring loaded check valve only is required in conjunction with the fuel metering and distributing unit when a solid injection fuel system is used for economical or other reasons.

In Fig. 23, 307 designates a lever journaled on a bearing 308 in the quadrant member 309. 310 is a hollow handle provided with a spring 311 and a pointed dog 312 which is adapted to engage in the notches 313, 314 etc. on the outer radial surface of the quadrant. 315 is a starting button with a contact 316 normally held out of electrical contact and in engagement with the inner radial surface 317 of the quadrant 309. A grip 318 is provided on the handle 310 and is adaptable to raise the spring pressed dog 312 out of the notches on the face of the quadrant when it is desired to move the position of the lever 307. 319 and 320 are insulated starting motor terminals connected to the insulated contact surface 321 and 322. 323 is a fuel control slide engaged with the pin 324 on the lever 307. The fuel control slide 323 and fuel control lever 325 are preferably made as a single casting journaled on the bearing 326 which is attached to the quadrant member 309. The fuel control rod 327 preferably formed with a clevis on the end and journaled on the pin 328. 329 is a bearing attached to the quadrant member 309 upon which is mounted the compression release levers 330 and 331 preferably formed as one casting. 332 is a roller bearing mounted on the pin 333 which is rigidly attached to the lever 307. 334 is a compression release rod preferably formed with a clevis on the end and attached to the lever 331 with a pin 335. The lever 307 is shown in the central or stop position with the roller 332 engaged in the concave notch 336 of the lever 330. In this position the rod 334 is adaptable to hold the engine valve from closing by approximately 1/64th of an inch and serves as an air brake to stop the rotation of the engine by friction of the air under the engine valves 9 or 109 as the case may be.

The starting button 315 cannot be engaged with either the ahead contact surface 322 or the reverse contact surface 321 while the lever is in the central or stopped position on the outer face of the quadrant member 309. The broken line 337 indicates the ahead starting position on the face of the quadrant member 309. With the lever 307 in this position the roller 333 moves to the dotted position 333a and out of the notch 336 raising the engine valves to practically full lift, completely releasing compression and allowing the cylinders free suction and exhaust. The starting button 315 can now be contacted on the ahead starting contact 322, thereby spinning the engine freely thru the medium of the electric starter. As soon as the engine is brought up to the proper speed the lever 307 can be moved to the running position indicated by the broken line 338 with the starting button 316 still on the contact 322. However, the roller 332 has moved to the position indicated at 332b which allows the lever 330 to drop, releasing the valve lift mechanism completely. In this position indicated at 338 and the starting button 315 depressed, the starting motor is spinning the engine ahead at full compression. It is to be noted that the fuel control slide 323 has been simultaneously moved enough to start the fuel pump injection fuel thru the medium of the lever 325, rod 327 and lever 44 on the fuel pump. The starting button 315 can be released as soon as the engine is operating on its own power. The lever 307 can be advanced to any of the notches shown at 314 as is required in operation. It is to be noted however, that the radius at the face of the quadrant between the central point and the end at 339 is not the same radius as the radius on the surface 317 which is the true radius between the center of the bearing 308 and the surface 317.

The notches at points 313 and 314 gradually increase in height from the center or stop position to the ends or wide open positions at 339 and 340 for the purpose of requiring a stiffer pull on the grip 318 which is resisted by the spring 311. In other words, it is impossible to accidently start the engine with a full throttle. It is to be understood that when the lever 307 is moved from the center toward the position 340 on the quadrant with the same steps as described in the ahead position the single valve engine shown in Fig. 1 will be started in a reverse direction because the contact point 316 when depressed by the button 315 will come in contact with the reverse contact 321 completing the circuit thru the starting motor and ground to the terminal 320. The terminal 319 is understood as being the ahead terminal when grounded on the movable contact 316 at the fixed contact 322.

It is to be understood that for governor control the fuel control rod 327 can be arranged to indirectly control the fuel by a governor means not shown. In other words, the fuel control rod 327 would control the action of a conventional governor which in turn would control the movement of the fuel control lever 44 on the fuel pump. In this case, the position of the lever 307 on the notches 313 or 314 would determine when the governor would either feed more fuel or cut down on fuel, depending on the speed of the engine. For instance, with governor control, notch 338 would hold the engine at minimum operating speed and notch 339 would hold the engine at maximum operating speed regardless of load.

Assuming that all oil and air lines are properly connected between the fuel pumps, air pumps and the injection nozzles and also that all control rods and electrical connections are properly made, starting of the single valve four cycle L head engine shown in Fig. 1 is accomplished by first, removing the fuel line vent plug 48a and expelling all air from the fuel system by manually operating the priming rod 67 on the fuel supply pump 38. Fuel is drawn into the suction side 75 and forced out of the discharge 74 to the surge chamber inlet 260 of the fuel metering pump 263 (Fig. 20). The engine is then slowly rotated until all air has been expelled from the fuel system. The vent plug 48a is replaced and the lever 307 in Fig. 23 is placed in the notch 337 which thru roller 333 and cam lever 330 with suitable control rods raises the valve 9 full lift by lowering the compression release lever 25 to which is attached the cam 27.

In other words, suitable control rod connections are provided between rod 334 in Fig. 23 and by which a movement of the lever 307 raises the engine valves off the camshaft as described previously. The starter button 315 is now depressed and closes an electrical circuit at the contact 316 and 322 which causes the starting motor 51 to rotate the engine freely without compression. As soon as the engine is up to the proper speed the lever 307 is advanced to the second position at 338. This movement causes the simultaneous dropping of both of the levers 330 and 323. The valve control lever 330 now allows the lever 25 to raise allowing the cam 27 to rest on the stop 28. The valve 9 is now actuated only by the cam 17. The fuel control slide lever 323 has been moved enough to cause the rod 327 to lower the fuel control lever 44 and advance the fuel pump piston 263 into operating position with the top of the stroke cutting off the port 262 forcing over fuel thru the distributor member 270 and supply lines 47 to the oil side 48 of the injection valve 41 (in Fig. 1) and finally depositing the fuel oil in the fuel nozzle. This is more clearly shown in Fig. 2 wherein 56 is the fuel valve, 57 is the air valve and 54 is the injection valve. The fuel is forced from the space 59 thru port 56a into cavity 58. As the engine is being rotated the engine driven air pump 43a supplies a charge of atomizing air for each firing stroke thru the air line 49 to the air side 50 of the injector 41. This feature is also more clearly shown in Fig. 2 where the air is forced thru the space 60 and the port 57a into the space 58 where due to its pressure it opens the atomizing valve 54 and sprays the fuel charge out into the combustion chamber 8 thru the circular nozzle orifice 55 around the seat of the valve 54. The piston 2 on the compression stroke has forced practically all of the air in the cylinder into the novel combustion chamber 8 and burning is continued over the valve 9 where a whirling turbulence is created by the novel form of the combustion chamber 8 and the motion imparted to the compressed charge by the piston 2 on compression stroke as shown in Fig. 5. As the piston starts down on the power stroke the compressed and burning charge of vaporized oil and air leaves the combustion chamber 8 and follows the piston down in the cylinder, thus again, causing a high state of turbulence and thorough mixing of the burning fuel and air. It is to be noted, for example, that on compression stroke a clockwise turbulence is created in the combustion chamber 8 and that on expansion stroke an anti-clockwise turbulence is created in the cylinder 3 and also that the air charge passes the fuel nozzle 55 twice on each firing cycle.

These are important and desirable features of the invention and serve to promote very flexible operation and excellent fuel economy regardless of whether the air injection features shown or solid injection principles are used to inject the fuel thru the nozzle 55 or 223.

As the piston 2 is forced down on the firing stroke the cam 17 raises the tappet 19 trapping a charge of lubricating oil in the chamber 24 by cutting off the port 23 thus raising the cup 20 and the valve 9 when the crank angle is 42 degrees from bottom center as is indicated by the exhaust timing diagram line 36.

The spent charge is discharged through the port 9a and orifice 11 into the Venturi formed exhaust pipe 10 on the upstroke of the piston causing a vacuum to be formed in the spaces 10a and 10b which is broken by a rush of air under atmospheric pressure thru the ported casing 12 and past the valve 14 thence thru the porous element 13 and upwardly into the inside of the exhaust pipe 10 serving to scavenge and cool the pipe 10 from the inside with fresh cool air. As the piston 2 reaches top center designated by the character ¢ and starts down on the next suction stroke designated by the inlet timing diagram line 37, a vacuum is created at the orifice 11 due to the fact that the single valve is still wide open. The inertia imparted to the exhaust gases on the exhaust stroke tends to keep them in motion in the manifold 10 and as the piston draws an inlet charge, fresh air is drawn thru the novel air filter within the perforated casing 12. It has been found that the valve 14 may be dispensed with in some cases as the exhaust impulses thru the orifice 11 are so nearly continuous, that at normal operating speeds a continuous stream of fresh air entering the perforated casing 12 does not allow the valve 14 to seat. However, it is very desirable and important feature on slow speed engines and also as an aid to prevent exhaust noises from issuing thru the ported casing 12. It is to be noted also that when the supercharging effect illustrated in Figs. 17 and 18 is used the elements 13 and 14 can be eliminated from the casing 12.

The lower closing end of the suction diagram line 37 is shown at 42 degrees past bottom center where the single valve 9 closes after having been continuously open during both the exhaust and inlet strokes. It is to be noted that at the end of the exhaust stroke the valve was naturally hottest and as it did not close but was used for the inlet valve also it was air cooled with the entire inlet air charge which completely passed around the head and stem. As the valve 9 closed at 42 degrees past bottom center on the suction stroke and the piston 2 compresses the inlet charge the operation described is repeated, i. e. only one valve is used to time the exit of the exhaust and closing of the inlet. On top center the single valve stays wide open after each exhaust and closes after the admission of each inlet charge. As the valve 9 is raised on a cushion of oil compressed in the cylinder 24 between the tappet 19 and the cup 20 any change in the length of the stem will be compensated for while the valve is seated because the port 23 is open to the lubricating system. Oil leakage past the cup 20 and tappet 19 will also be compensated for at each seating of the valve 9 by oil under pressure thru port 23 which will exert a pressure in the cylinder 24 equal to that adjusted by the pressure adjustment member 31. It is to be understood that the bore in the guide 18 is smaller for the cup member 20 than for the tappet 19 which serves as a means to raise the valve 9 higher than the actual cam lift with a hydraulic power applied from a larger to a smaller piston. It is also to be understood that the normal lubricating system oil pressure on the bottom of the cup member 20 simply contacts the cup on the end of the valve stem and is not of sufficient power to raise the valve until the tappet 19 is raised by the cam 17 cutting off the port 23 and increasing the pressure until the weight of the valve spring 9b is overcome. In the event that sufficient oil pressure from the lubricating system does not raise the cup 20 into contact with the valve stem as shown in Fig. 1 the cam 19 can raise the valve enough to allow the engine to operate but with excessive stem clearance which will serve as a warning of low oil pressure.

The impaired valve lift will also limit the air pumping ability of the engine and thus limit the power output to prevent damage to the lubricated parts of the engine. A modified form of this invention is shown at Fig. 4, wherein a check valve 425 is used to prevent the oil in the cylinder 424 from flowing back into the lubricating system when the cam 417 raises the valve 407 instead of relying on the upper edge of the tappet only serving as a valve as in Fig. 1.

As the engine rotates in operation the fuel supply pump 38 is caused to operate in the following manner. Oil from the lubricating system in Fig. 1 is forced under pressure from the duct at 22b into the drilled port 22c in the cam shaft 16 then into the fuel pump 38. An enlarged view in Fig. 3 further illustrates this part of the invention wherein oil under pressure enters the port 30a and passes thru the port 30b in the camshaft 16a to the port 30c in the nipple connection between the pump casing 63 and the crankcase 39a and into the space 63a on the motor side of the diaphragm 64. The oil pressure forces the diaphragm outwardly against the spring 66 compressing fuel in the casing 65 and forcing same out thru the check valve 73 and outlet 74 to the fuel metering pump 43. As the camshaft 16a rotates in the direction indicated by the arrow the drilled port 30b lines up with the ports 30c and 30d discharging the oil by the pressure of the spring 66 against the diaphragm 64. As the diaphragm moves toward the engine a suction is created at the inlet port 75 and fuel is drawn in thru the hollow plug 70 and the conical hollow relief valve 68 around the inlet check valve 69 and into the casing 65.

During operation, the pump 38 builds up a predetermined adjustable pressure on the fuel metering system which is limited by the adjustable plug 70 against the spring 68a and relief valve 68. As an example, the spring 68a is adjusted to a five pound pressure on the hollow relief valve 68 which seats at its rim on the casing 65.

The inlet notched disc check valve 69, guided in the casing 65, seats on the smaller hollow circular outlet of the conical valve 68 and as the pulsating pressure impulses are built up on the inside faces of the valves 68 and 69 to more than 5 lbs. the spring 68a yields and allows the valve 68 to release the excess pressure from the inside of the casing causing a slight back flow in the suction line. In other words, when an adjustable and predetermined pressure on the fuel system is reached the fuel simply pulsates back around the relief valve 68 into the suction line. The suction is taken thru the center of the hollow conical valve 68 and the relief or back flow around the periphery.

In the event of lubricant pressure failure from any cause the fuel supply pump can not function therefore it becomes an important feature of the invention because an engine can not be operated to destruction without lubricant as the lubricant pressure must be up to normal to furnish fuel for operation.

In other words, during operation lack of lubricant pressure automatically eliminates the fuel supply. It is to be understood that this novel fuel supply pump can be used on any engine and also adopted to other purposes and modified in form to suit particular requirements. For instance, the bore in the plug 70 can be calibrated to form a maximum speed or load governor, and the pump used on either gasolene or Diesel engines.

The lubricating system is provided with a filter 35 which is interposed between the reservoir 32 and the lubricant pump suction 29a. The oil must pass up thru the filter 35 before reaching the pump suction as indicated by the arrows. However, the filter member 35 is flexible and in the event that it should become clogged or the oil too heavy to pass freely, the partial vacuum created behind the filter by the pump 29 will cause the filter member 35 to raise slightly and bypass the upper strata of the oil in the sump 33 around the edge of the filter at 35a. The sludge in the bottom of the sump 33 can be readily drained at the plug 34. During draining of the sump it is to be noted that all the oil inside of the filter 35 on the pump suction side at 29a will back out thru the filter 35 from the top cleansing the lower face of collected sludge and contamination.

Referring to Fig. 10, the valve-in-head modification of the invention shown in Fig. 1 the same general starting, operating and mechanical features such as the control mechanism, fuel supply pump, fuel metering and atomizing pump, air and oil filters, manifold etc. are important features of this form of the invention. However, the valve in head design requires special modification of such features as the combustion chamber, fuel injection nozzle position and the automatic means of eliminating the valve tappet adjustment arrangement. In operation the valve 109 functions as to timing etc. exactly as the valve 9 in Fig. 1.

The compressed air charge on compression stroke is forced from the cylinder 103 into the chamber 108 in such a manner that the same whirling turbulence is created in the combustion chamber 108 as is present in the chamber 8 of Fig. 1. All of the air is expelled from the cylinder 103 and piston clearance only provided at 177 in Fig. 10 and 177a in Fig. 11, therefore as the air is forced into the spiriling chamber 108 from the side of the cylinder 177a opposite the valve 109 it is caused to spin as indicated by the arrows in Fig. 11.

Fuel injection takes place as the last of the compression charge is leaving the cylinder 103 and burning is accelerated by the air stream forcing the spray into the whirling turbulence in the chamber 108. As the piston starts down and expansion takes place the whirling compressed and burning charge of oil and air in the chamber 108 must reverse its motion and return to the cylinder again passing the point of fuel injection at the nozzle 55 of the injection valve 141. Thus the fuel nozzle is swept with the air charge on both the compression and expansion strokes. It is also to be noted that the whirling movement imparted on compression is reversed on expansion thus causing a whirling turbulence in the cylinder during the entire firing stroke.

The modified form of the invention shown in Fig. 17 is particularly adaptable to engines of the single or double cylinder type and incorporates such novel features of the invention as the single valve, combustion chamber oil and air pumping means, method of fuel injection manifolding, etc. plus the features of employing the compression pressure as the first stage of injection air pressure thru the port 224 and the fact that both oil and air pumps are incorporated in the head and removable with same.

In operation fuel is supplied to the surge chamber inlet 220 at a predetermined pressure and fills the passages 219, 217, 197 and the valve 196. Air is removed thru the valve 221. The valve 199 is raised for starting as previously described and the engine rotated without compression or fuel injection until a certain speed is reached, which when sufficient to carry the flywheel over on full compression the valve 199 is dropped onto the camshaft and the lever 205 lowered until the fuel control wedge 203 raises the fuel pump piston 212 into working position. In this case with the engine rotating the piston 212 forces fuel back thru the port 219 into the surge chamber 218 until the top of the piston cuts off the cross-drilled port 217. As the piston continues to raise to the end of the stroke all of the oil in the cylinder above the port 217 is forced past the ball check into the passage 197 and as the check valve 196 is completely full an injection of fuel is delivered around the stem and out around the head of the valve at 196a into the space 226 in the injection valve 195. This operation is accomplished preferably on suction stroke. Compression stroke follows and air is charged into the cylinder 225 thru port 224 and passage 224a.

At an adjustable point, (say dead center for starting and 25 degrees advance for normal operating speed) the cam 229 raises the piston 239 discharging all of the compresed air in the cylinder 225 thru passages 224a and 226 forcing open the valve 222 and completely atomizing the fuel (thru the nozzle 223) which was previously deposited in the space 226 on the suction stroke by the pump 212. It is to be noted that when the piston 239 is down during the compression stroke the lower rim rests on the member 241 forming a pressure tight seal. Also the spring 240 allows the piston 239 to actually contact on the top of the clyinder as the pressure in the cylinder is released thru the atomizing valve 222. In operation the rod 242 is positively driven upwardly compressing the spring 240 between the member 240a and the bottom of the head of the piston 239. The piston 239 is raised until the air compressed in the cylinder 225 reaches a pressure high enough to deflect the spring 240. As the piston 239 reaches a point near the top of the stroke the air compressed in the cylinder 225 reaches a pressure high enough to force open the valve 222 and as the atomizing air escapes from the cylinder the spring 240 causes the piston 239 to follow, completing the stroke and driving all of the air out of the cylinder 225. The spring 240 also compensates for the variation of stroke length when the position of the roller 230 is changed on the camshaft 228, indicated at dotted positions 230a and 230b.

It is to be understood that the drawings are for the purpose of illustrations only and that various modifications and changes may be made in the details of construction and methods of operation to suit various requirements and purposes without departing from the spirit of the invention. For instance, the fuel pump may be used for so solid injection without resorting to air atomization or a governor may be arranged between the operating mechanism shown in Fig. 23 and the fuel control lever 24 as previously explained, or the lubricant supply pump 29 may be modified etc. from a conventional type to a special type suitable for delivering lubricant to the lubricating system regardless of the direction in which the engine is operating or other modifications as conditions may require.

Having thus described my invention, what I claim is:

1. In a hydro-carbon engine having a combustion chamber formed therein, a single valve in said combustion chamber, a manifold connected with said valve, and means adaptable to discharge exhaust gases and draw air into said manifold by the exhaust gas pressure of said hydro-carbon engine.

2. In a hydro-carbon engine, a cylinder, a piston, a valve, a combustion chamber surrounding said valve, and an exhaust outlet orifice discharging into a Venturi formed manifold.

3. The combination with a four-cycle internal combustion engine having a single valve with means for maintaining the valve open during the exhaust and intake stroke of the engine, of a manifold having an outlet for exhaust gases and an inlet for fresh air, and a connection between the valve and the manifold for directing exhaust gases into the manifold in one direction so as to induce a flow of fresh air through the manifold.

4. The combination with a four-cycle internal combustion engine having a single valve with means for maintaining the valve open during the exnaust and intake stroke of the engine, of a manifold having an outlet for exhaust gases and an inlet for fresh air, and a connection between the valve and the manifold for directing exhaust gases into the manifold in one direction so as to induce a flow of fresh air through the manifold past the valve connection, both during the discharge of the exhaust gases and after the discharge of the exhaust gases, so as to permit fresh air to enter the connection and the cylinder during the intake stroke of the engine.

5. The combination with a four-cycle internal combustion engine having a single valve with means for maintaining the valve open during the exhaust and intake stroke of the engine, of a manifold having an outlet for exhaust gases and an inlet for fresh air, a connection between the valve and the manifold for directing exhaust gases into the manifold, and means actuated by the discharging exhaust gases for inducing a flow of fresh air through the manifold and past the connection between the valve and the manifold.

6. The combination with a four-cycle internal combustion engine having a single valve with means for maintaining the valve open during the exhaust and intake stroke of the engine, of a manifold having an outlet for exhaust gases and an inlet for fresh air, and a nozzle connected with the valve and projecting into the manifold whereby exhaust gases are directed toward the outlet of the manifold and an injection action is produced to induce a flow of fresh air through the manifold and past the nozzle.

CHARLES A. WINSLOW.